May 6, 1930.  H. A. THOMPSON  1,757,153
FILTERING OR LIKE DEVICE
Filed Jan. 12, 1929   2 Sheets-Sheet 1
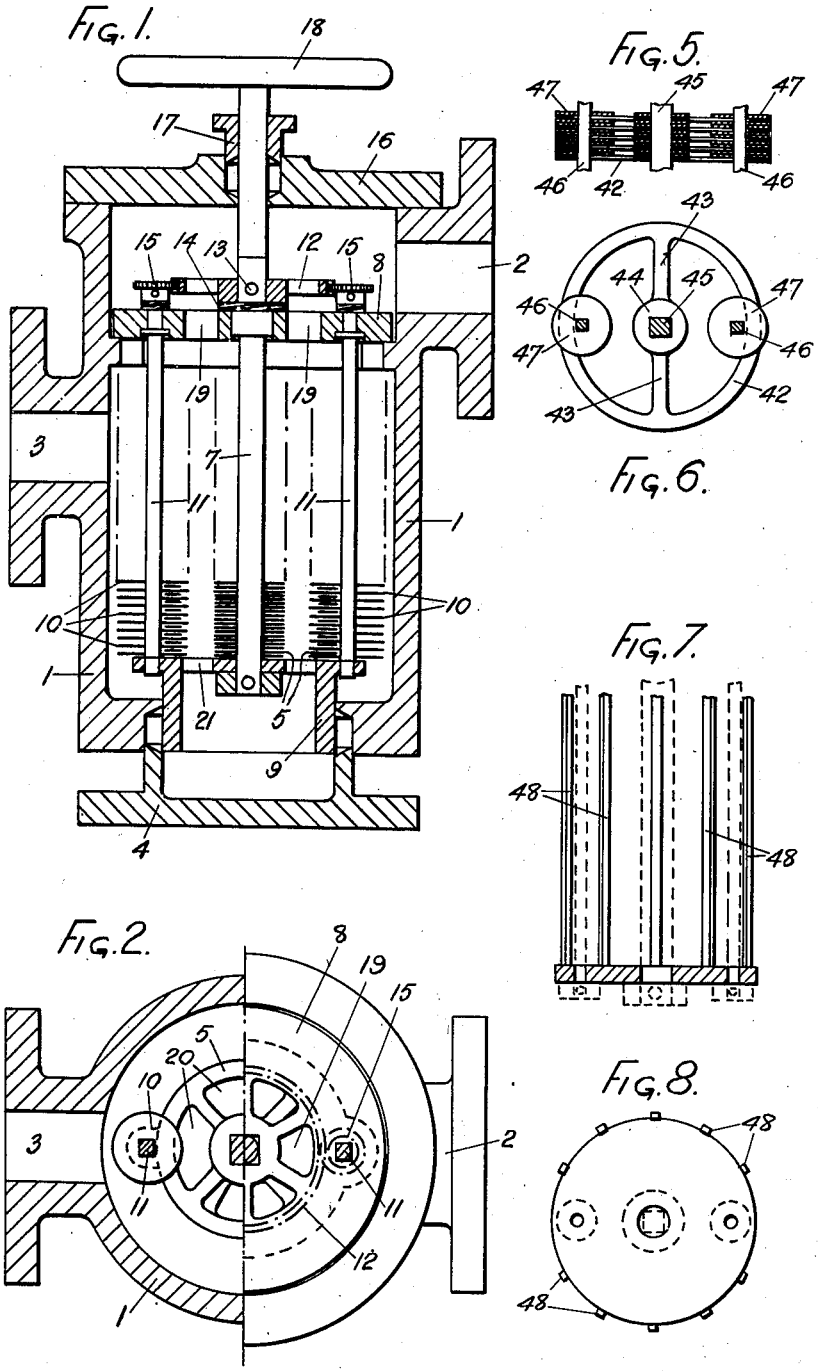

May 6, 1930.  H. A. THOMPSON  1,757,153
FILTERING OR LIKE DEVICE
Filed Jan. 12, 1929  2 Sheets-Sheet 2

INVENTOR.
H. A. THOMPSON

Patented May 6, 1930

1,757,153

UNITED STATES PATENT OFFICE

HERBERT ALEXANDER THOMPSON, OF MORPETH, ENGLAND, ASSIGNOR TO SWINNEY BROTHERS LIMITED, OF MORPETH, ENGLAND, A CORPORATION OF GREAT BRITAIN

FILTERING OR LIKE DEVICE

Application filed January 12, 1929, Serial No. 332,076, and in Great Britain July 31, 1928.

This invention relates to filtering and like devices, particularly for filtering oil, and has for its object to provide an improved and rugged filter which can be continuously operated at a steady rate without becoming clogged. A further object consists in arranging a pair of filters so that either can be operated while the other is out of use for cleaning. A further object is to provide a filter comprising a plurality of spaced, coaxial, annular laminations with scraper elements disposed therebetween, and to so arrange the device that the scraper elements and laminations can be rotated in unison continuously or to-and-fro about their respective axes, so that the scraper discs act definitely as rotary cutting shears, for removing the refuse from the spaces between the laminations.

These and other objects are more fully explained in the following description, reference being had to the accompanying drawings, where certain forms of filters according to the invention are disclosed. The novel features of my invention are set forth with particularity in the statement of claim annexed hereto, and I desire it to be understood that the arrangements illustrated represent only preferred arrangements, and that numerous modifications can be made without departing from the scope of the invention as set forth in the annexed claims.

In the drawings:—

Fig. 1 is a half-sectional view in side elevation of one arrangement of these cleaning and filtering plates mounted in a suitable body casting with inlet and outlet branches, covers and cleaning door.

Fig. 2 is a half-sectional plan view of the same.

Figure 3:
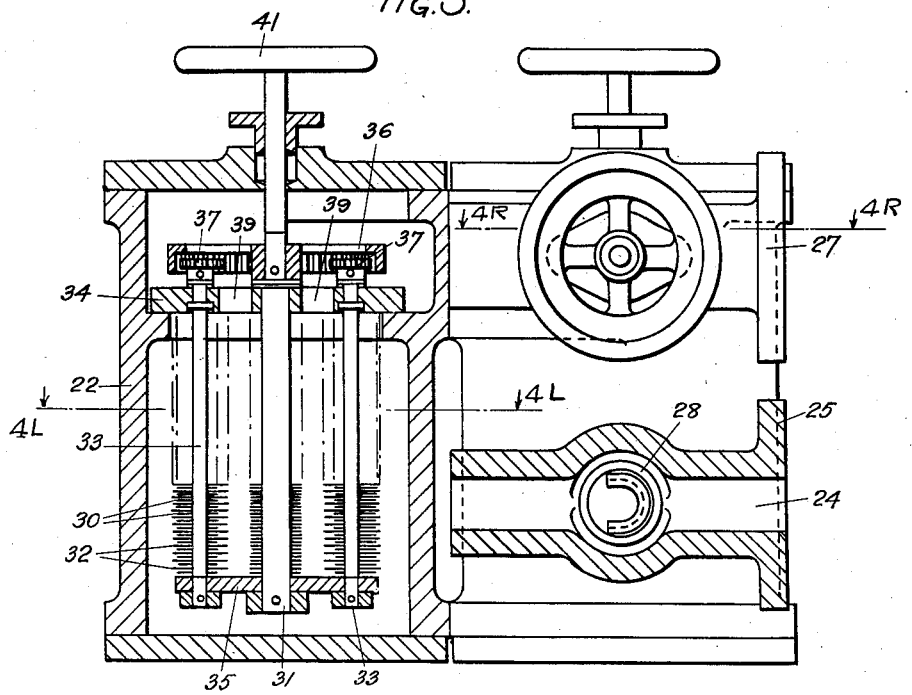

Fig. 3 shows a half-sectional view in side elevation for an arrangement of modified filters in duplicate, in which separate inlet and outlet valves are fitted to each chamber so that one chamber may be opened up for examination and repairs whilst the other is in use, or vice versa. The left-hand half is mainly a section taken on the line 3L—3L of Fig. 4: the section of the right-hand half is taken on the line 3R—3R of Fig. 4.

Figure 4:
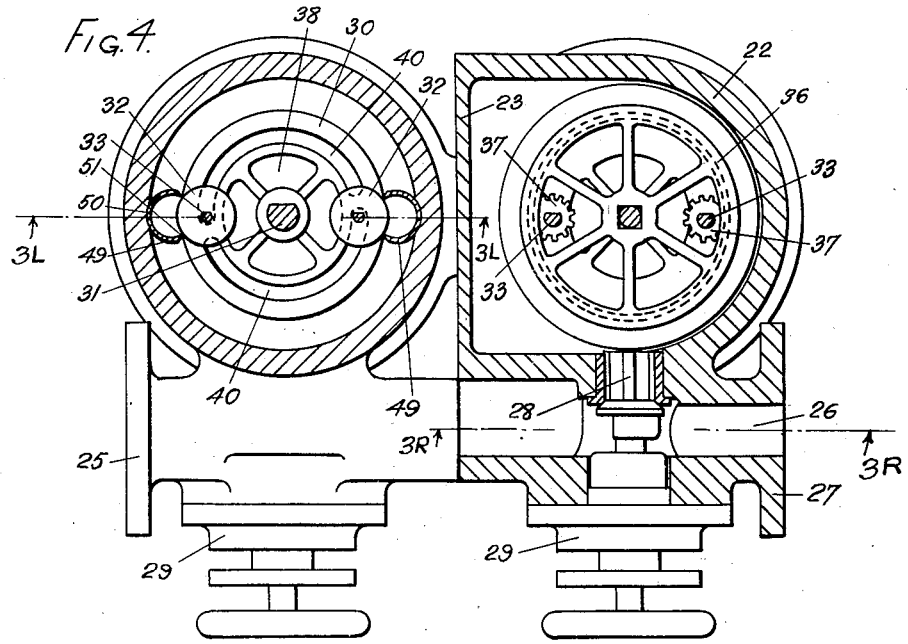

Fig. 4 is a half-sectional plan view of the arrangement of Fig. 3. The left and right halves are sections about the lines 4L—4L and 4R—4R of Fig. 3 respectively.

Figs. 5 and 6 are, respectively, a side and top view of a modification applicable to the arrangement shown by Figs. 3 and 4.

Figs. 7 and 8, are, respectively, a side and top view of an arrangement applicable to the filters shown in the preceding figures.

It should first be noted that in Figs. 1 and 2 the cleaning discs or scrapers are arranged on the outside of the filtering discs or main laminations, and with this arrangement the grit and other deposits are cut through and forced inwardly to drop down inside of the filtering disc assembly and into a sump chamber shown at the bottom.

In Figs. 3 and 4 the filtering discs proper are provided with semi-circular slots to enable the cleaning-disc or subsidiary spindles to pass through the same, thereby enabling the scrapers or cleaning discs to be brought inwards so that their cutting motion is in an outward direction. With this arrangement the operation is a semi-rotary operation.

Referring now to Figs. 1 and 2, (1) shows a form of body casting or container having an inlet branch (2), an outlet branch (3) and a combined sump cover and gland (4). The coaxial annular laminations or filtering discs (5) are shown mounted on and spaced along a main central spindle (7) which passes through the common top assembly plate (8) and the bottom common assembly structure (9). The cleaning or scraping elements (10) engaging the spaces between the main laminations, are mounted on subsidiary spindles (11) (of which two only are here shown) which are secured so as to be free to rotate in the common assembly fittings (8) and (9). The main spindle (7) on which the annular filtering discs are mounted is fitted with a gear wheel (12) which is secured to the same by any suitable means such as a split or dowel pin (13), the necessary resilient contiguity of the cleaning plates 10 and discs 5 being maintained by a spring washer (14) of well-known type inserted between the gear wheel (12) and the common assembly plate (8). A similar washer 14 is disposed on each of subsidiary spindles 11 for the same purpose. The subsidiary spindles (11) have fitted to them gear wheels (15) which may be secured in a similar manner to that described above. The central spindle (7) is extended through a cover (16) passing through a suitable gland and stuffing box (17), and the end of the spindle is provided with a handwheel (18) or with other means by which its rotation may be effected. The main shaft (7) may be adapted for being power driven instead of manually driven if desired.

In use the operation would be as follows:—

The liquid or other substance to be filtered will enter by the inlet branch (2) and pass down through suitable holes (19) in the top assembly plate (8). The only outlet path provided for the fluid is between the layers of filtering plates (5) in a radial outward direction. These filtering plates being suitably spaced to deal with the refuse will only allow filtered liquid or material to pass outwardly through the spaces between them and thence through the outlet branch (3). Filtration having proceeded for a predetermined length of time, according to the amount of refuse contained within the liquid or material being dealt with, it may then be found that the filter is showing signs of choking. When this is apparent (and it may be detected by means of pressure gauges on the inlet and outlet branches which will show a difference in pressure) the operator will proceed to rotate the main shaft (7) by means of the hand wheel (18). This will cause the annular discs (5) to be rotated as a whole, as they are suitably secured on the shaft (7). At the same time as the main shaft is rotated, the gear wheel (12) on the same, meshing with the wheels (15) on the cleaning-disc or subsidiary shafts, will cause the scraper discs (10) to rotate in an opposite direction to the path of the filtering discs (5). The result will be that obstructions between plates (5) will be forced inwardly and will drop down through holes (20) provided in the filtering discs (5). This refuse will drop downwards to the sump chamber which is provided by means of the cover (4) through holes (21) in the bottom common assembly fitting (9). This cover (4) may be attached by any well-known means which will provide a method of quickly releasing and again securing the same in position, to facilitate rapidity of cleaning out deposits.

It will be found that by rotating the handwheel once the scraper cleaning discs will have effectively cut out all obstructions between the filtering plates, so that the filter is again serviceable without further attention.

Figs. 3 and 4 illustrate an alternative arrangement for the cleaning discs and filter laminations and also for the body structure. This body structure (22) is arranged in twin or duplicate form, but it is provided with a division (23) so that the right and left-hand chambers are entirely separate. (24) is a common inlet branch or passage which has a flange (25) fitted at each end, the two flanges being provided purely to facilitate installing, so that the supply pipe may be brought either to the right-hand or left-hand side as desired; and naturally one or other of the flanges would be stopped off by means of a blank flange when not in use. A similar arrangement is employed for the outlet passage (26), each end of which is also provided with a flange (27). Both the inlet passage (24) and the outlet passage (26) are each fitted with two valves (28) giving access to each chamber. These valves may be of any suitable design with the necessary assembly of hand-wheel, gland covers and spindles etc., designated by the reference numeral (29).

The left-hand chamber has been shown in section and the filtering discs (30) in this arrangement are mounted on a main spindle (31) and the scraper or cleaning elements (32) are mounted on subsidiary spindles (33). These shafts are again housed in a common top assembly plate (34) and bottom assembly plate (35). The main spindle (31) in this case is shown with an internally-toothed wheel (36) which meshes with gear wheels (37) fitted to the subsidiary spindles (33). These wheels are again fitted in any convenient manner, such as that mentioned above in connection with Figs. 1 and 2.

In the case of the arrangement of Figs. 3 and 4 the operation is as follows:—

The liquid to be filtered would be admitted, say, to the left-hand chamber from the common branch (24) by means of the left-hand valve (28) (not actually shown) in this branch. The liquid in order to pass through the apparatus must proceed radially between the filtering plates (30) from the outside to the inside. The filter plates (30) are provided with holes (38) so that the filtered fluid can pass upwards and through corresponding holes (39) in the common top assembly plate. The left-hand valve (28) (not actually shown) in the common outlet passage (26) being open the liquid is free to pass on to its destination.

In this arrangement semi-circular slots or paths (40) are provided in the filtering plates to allow the subsidiary spindles (33) to pass through the assembly, thereby enabling the cutting or cleaning elements (32) to be kept closer in towards the main spindle (31) whereby an outward cutting motion can be achieved with the cleaning or cutting discs (32). The deposits between the filtering plates (30) would naturally be on the periphery, and, therefore, when the main spindle (31) is rotated, and as a consequence the subsidiary spindles (33) are also caused to move, through the gearing, the refuse will be forced outwardly and will fall into the space between the periphery of the cleaning discs and the body chamber (22). The wheel (41) will be rotated alternately to the right and then to the left, that is, the motion will be a semi-rotary motion instead of a continuous one.

In Fig. 4 there are shown scrapers (49) of C section, which will preferably be made from strips of suitable material rolled into semi-tubular form and occupying the full length of the space between the top and bottom common assembly plates. These scrapers may be secured in position by any suitable means and they are shown as being inserted into a recess (50) in the body wall (22). These fixed scrapers are provided with duplicate sets of shaped or knife-like edges (51) which are presented externally of the filtering members (30) and on each side of the cleaning discs or scrapers (32) projecting beyond said filtering members. At such edges there are substantially no open spaces, but clear lines of metal are presented jointly by the edges of the filtering members (30) and of the scraper elements (32). The fixed scrapers effectively ensure that the refuse which is thrust out outwards by the movable scraper elements (32) is prevented from passing round and being drawn inwards again as they rotate. These fixed scrapers, however, need not be fitted in all cases, as in the case of gritty material this would automatically drop to the bottom; but where gummy or sticky materials are being dealt with the fixed scrapers are an additional advantage, as they completely prevent adhesions to the movable scrapers or cutting discs.

Obviously the fixed scraper may be provided also in the filter shown by Figs. 1 and 2.

Figs. 5 and 6 show an alternative construction of the main cleaning plates or laminations (30) of Figs. 3 and 4, whereby the semi-circular paths (40) therein may be eliminated, due to making each of the cleaning plates (42) (Figs. 5 and 6) in the form of a ring having two connecting or radial arms (43) in the centre of which a boss or swelling (44) is provided for the main spindle (45) to pass through. In this case the spindle is shown of rectangular section, as also are the subsidiary spindles (46) in the cutting or cleaning discs (47). The radial or connecting arms (43) may be curved or of such shape as will tend to stiffen or support the ring (42) to prevent buckling instead of being straight.

Figs. 7 and 8 show a form of cage or grid which may be employed to surround the cleaning discs illustrated in any of the preceding figures in order to break up the annular spaces or openings between the main discs or laminations into narrow slots. Any number of vertical bars (48) of any suitable design may be employed and they may be secured between the top common assembly plate (8) and the bottom assembly fitting (9) in Figs. 1 and 2 or between the common top assembly plate (34) and the bottom assembly plate (35) in Figs. 3 and 4, or in any other manner. The reason for employing such a cage is that if fibrous material is being dealt with in the filtration process there is a liability of such fibrous material being drawn through the open slots or spaces between each of the circular filtering plates, but if this cage is fitted to surround them the effect is obtained of producing suitable slottings.

What I claim as my invention, and desire to secure by Letters Patent is:—

1. In a filter device, the combination of a plurality of annular laminations spaced along a main spindle, said laminations being movable axially of but rotatable with said main spindle, a subsidiary parallel spindle having scraper elements which are movable axially thereof but rotatable therewith, said scraper elements being arranged to extend into the spaces between said laminations, a spring-washer disposed on the main spindle and a spring-washer on the subsidiary spindle to maintain the annular laminations and scraper elements in close and resilient assemblage, a toothed gear on said main spindle, and a gear on said subsidiary spindle meshing therewith to provide synchronous rotational movement of the main and subsidiary spindles.

2. In a filter device, the combination of a plurality of annular metal laminations spaced along and rotatable with a main spindle, said laminations forming a cylindrical chamber provided with peripheral openings, means closing one end of said chamber, a subsidiary parallel spindle carrying scraper discs rotatable therewith and extending through an arcuate slot in said laminations, said scraper discs extending into the peripheral openings and engaging the radial faces of said laminations, and means interconnecting said spindles to provide synchronous rotational movement thereof.

3. In a filter device, the combination of a plurality of annular laminations spaced along and rotatable with a main spindle, a plurality of scraper elements spaced along and rotatable with a parallel subsidiary spindle, said scraper elements being arranged to extend into the spaces between said laminations, plates at the end of the assembly of laminations and scraper elements in which said spindles are journalled, a gear on said main spindle adjacent one of said plates, a gear on said subsidiary spindle meshing therewith to provide synchronous rotational movement of the main and subsidiary spindles, said first mentioned gear having axial holes therethrough, and means for supporting one of said plates so that said assembly depends therefrom.

4. In a filter device, the combination of a plurality of annular laminations spaced along and fixed on a main spindle, said laminations forming a cylindrical chamber provided with peripheral openings, a plurality of scraper discs spaced along and rotatable with a parallel subsidiary spindle, said scraper discs being arranged to extend into the peripheral openings between said laminations, plates at the ends of said chamber, one plate having an opening therethrough, and both plates providing bearings for said spindles, means for hanging the assembly of laminations and discs from one of said plates, a gear wheel on said main and a gear on said subsidiary spindle meshing therewith, said first mentioned gear having an opening therethrough and being adjacent said plate provided with the opening.

5. In a filter device, the combination of a plurality of similar, co-axial annular laminations equally-spaced from one another and forming a hollow chamber, means closing one end of said chamber, a plurality of similar co-axial discs arranged eccentrically of said chamber and extending into the spaces between said laminations, said discs each having a width substantially equal to the width of each of said spaces, means for effecting relative rotational movement of said laminations with respect to said discs, and a fixed bar having a knife-like edge engaging jointly said laminations and discs.

6. In a filter device, the combination of a plurality of similar, co-axial annular laminations equally-spaced from one another and forming a hollow chamber, means closing one end of said chamber, a plurality of similar co-axial discs arranged eccentrically of said chamber and extending into the spaces between said laminations, said discs each having a width substantially equal to the width of each of said spaces, means for effecting relative rotational movement of said laminations with respect to said discs, and a fixed scraper of C-section having knife-like edges presented externally of said laminations and on each side of the discs projecting beyond said laminations.

7. In a filter device, the combination of spaced co-axial annular laminations adapted for rotational movement as a whole about the common axis, other spaced co-axial laminations adapted for rotational movement as a whole about their common axis, the latter laminations extending into the spaces between said first-mentioned laminations, gearing inter-connecting the two groups of laminations for synchronous movement, and fixed scraper means adapted to engage both groups of laminations.

8. In a filter device, the combination of a plurality of similar, co-axial annular laminations equally-spaced from one another and forming a hollow chamber, means closing one end of said chamber, a plurality of similar co-axial discs arranged eccentrically of said chamber and extending into the spaces between said laminations, said discs each having a width substantially equal to the width of each of said spaces so as to engage the radial faces of said laminations, and means for rotating said laminations and discs in unison about their respective axes, said means comprising meshing gears at the end of said chamber opposite to said closed end, and one of said gears having openings therethrough for the passage of fluid.

HERBERT ALEXANDER THOMPSON.

CERTIFICATE OF CORRECTION.

Patent No. 1,757,153.  Granted May 6, 1930, to

HERBERT ALEXANDER THOMPSON.

It is hereby certified that the above numbered patent was erroneously issued to "Swinney Brothers Limited", as assignee of the entire interest in said invention, whereas said patent should have been issued to the inventor said "Thompson and Swinney Brothers, Limited, of Morpeth, England, a Corporation of Great Britain", said corporation being assignee of one-half interest only in said invention, as shown by the records of assignments in this office; and that the said Letters Patent should be read with this correction therein that the same may conform to the record of the case in the Patent Office.

Signed and sealed this 24th day of June, A. D. 1930.

(Seal)

M. J. Moore,
Acting Commissioner of Patents.